Aug. 28, 1928.
W. K. McMILLAN
1,682,137
TRACTOR SCRAPER
Filed Feb. 9, 1927 2 Sheets-Sheet 1
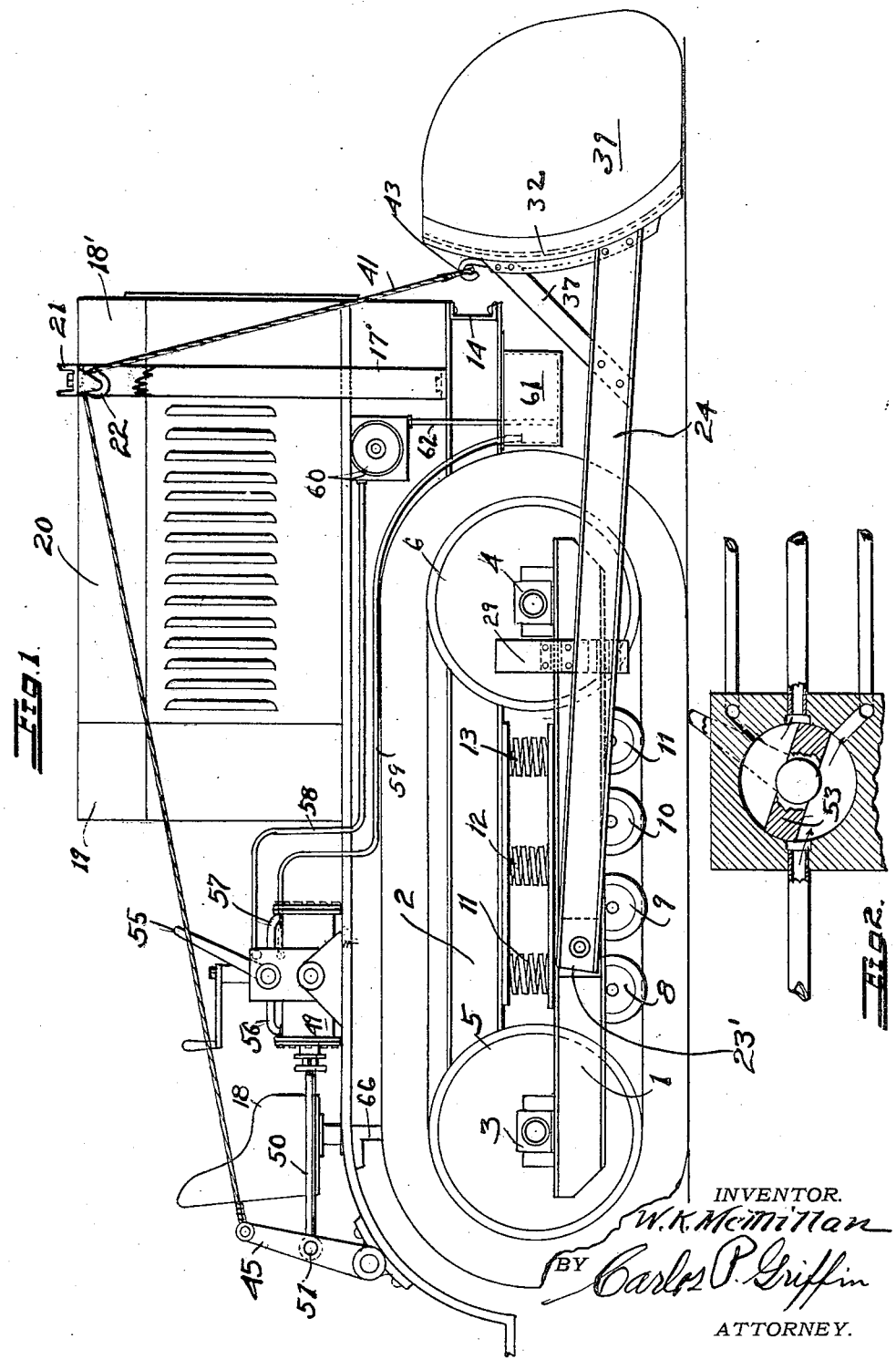

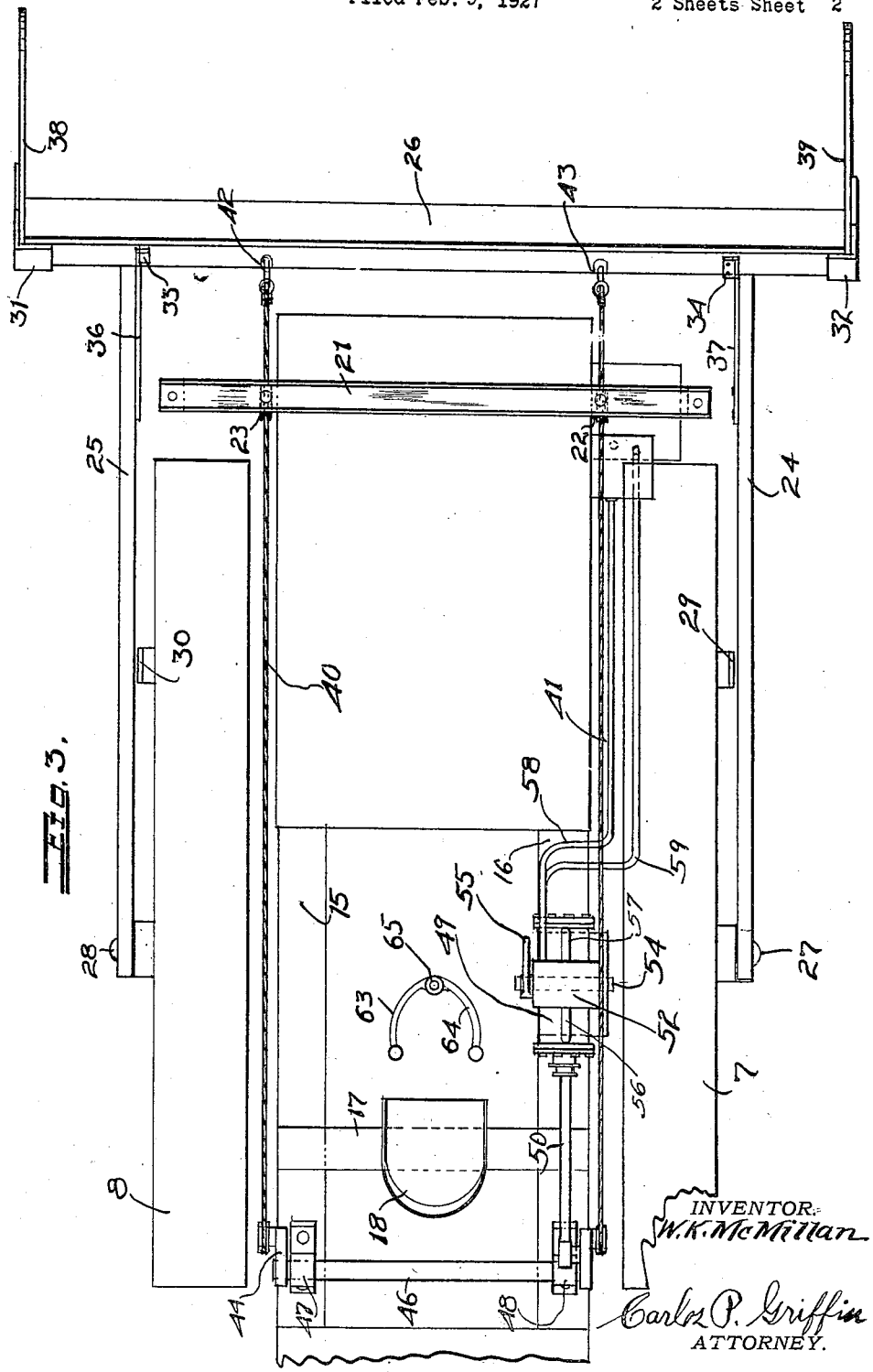

Patented Aug. 28, 1928.

1,682,137

UNITED STATES PATENT OFFICE.

WESLEY KENNETH McMILLAN, OF SAN FRANCISCO, CALIFORNIA.

TRACTOR SCRAPER.

Application filed February 9, 1927. Serial No. 166,824.

This invention relates to a scraper which is attached to a tractor of the endless tread type, and which is intended to push the pile of earth or other material ahead of the tractor, the object being to make the scraper especially usable in the case of pushing dirt down an embankment, or into a cut or ditch which is to be filled up, the tractor itself operating upon the solid ground or filled ground, while the scraper is far enough ahead of the tractor to push the earth into the fill without danger of having the tractor itself following the earth down the steep embankment.

Many other uses will suggest themselves to persons familiar with the art, this scraper being also especially usable for scraping along the side of a road when the dirt is to be brought toward the center of the road, or to be pushed out of a ditch where it is convenient to have the operating apparatus in the rear of the scraper.

Other objects of the invention will be apparent as the description proceeds.

An embodiment of the invention is shown in the accompanying drawings in which the same reference numeral is applied to the same portion throughout the several figures of the drawings and of which there may be modifications.

Figure 1 is a side elevation of the complete apparatus,

Figure 2 is a diagrammatic sectional view of the operating valve for raising and lowering the scraper, and, Figure 3 is a plan view of the complete apparatus.

The numerals 1 and 2 indicate the side frames of the tractor which support the bearing boxes 3 and 4 for the tractor wheels 5 and 6, the construction being substantially identical on both sides and the wheels running on the endless treads 7 and 8, which treads are diagrammatically illustrated in the drawings.

A plurality of small wheels 8, 9, 10 and 11 bear upon the lower tread of each of the endless tractor treads and carry the load by means of a series of spiral springs 11 to 13 on each side intermediate the main wheels 5 and 6, all of the said construction being common to the art. Supported above the main frame of the longitudinal members 2 of the main frame, which are connected together at the front by means of a channel bar 14 are two longitudinally extending bars 15 and 16 which carry a cross bar 17 at the rear end for the support of the seat 18 and which bars also are connected to a supporting post 17' at each side of the radiator 18'. The fuel tank 19 is placed in the usual position and the hood 20 covers the space occupied by the engine.

The two posts 17' are connected together across the top by means of a channel bar 21, which channel bar passes over the top of the hood 20. The channel bar 21 carries the blocks 23' and the pusher bars 24, 25 which are connected to the scraper 26 at the front end are pivotally connected to the side bars 1 on each side by means of the two heavy bolts 27—28 also secured to the bars 1. On each side are the two plates 29 and 30 (see Figure 3) which plates serve to act as a bearing for the two bars 24 and 25 to prevent them from binding laterally against the endless tread whenever the tractor is turned slightly.

The curved scraper member 26 is reinforced at its ends by means of the curved angle bars 31 and 32, and it is connected to the ends of the bars 24 and 25 by means of the angle bars 33 and 34, which are in turn secured to two braces 36 and 37, said braces being also connected to the bars 24 and 25.

In order to prevent the dirt from passing beyond the ends of the scraper when it is in use, it is provided with two end wings 38—39 which wings are secured respectively to the angle members 31 and 32. Cables 40—41 pass from hooks 42 and 43 on the scraper 26 over the pulleys 22 and 23 and back to the arms 44 and 45 which are connected to a shaft 46. The shaft 46 is journaled in two bearings 47 and 48 mounted on the bars 15 and 16 back of the driver's seat, and just at the right of the driver in front of him there is a hydraulic cylinder 49. this cylinder operates a piston rod 50 which at its rear is pivotally connected to the arm 45 by means of the pin 51. A valve casing 52 is mounted on the cylinder and it contains the valve 53. This valve is mounted on a shaft 54 and it is operated by means of the handle 55, pipes 56 and 57 connect opposite ends of the cylinder 49 with the valve casing 52 while other two pipes 58 and 59 connect the valve casing respectively with the pump 60 and liquid receptacle 61, said pump having a suction pipe 62 to enable liquid to be drawn from the receptacle 61 and forced into the cylinder 49.

The direction of the operation of the piston rod 50 is determined by the position of the handle 55, and it may be either pushed out or pushed in, in accordance with the desire of the workman to raise or to lower the scraper 26.

The tractor is operated by the ordinary levers common to such apparatus, and is started by means of the two levers 63—64 which are secured to the shaft 65. The rear end of the two bars 15 and 16 are supported on the frame of the machine by means of short posts 66, one of which is shown in Figure 1.

The operation of the apparatus will be obvious from the foregoing description in which it will be seen that if a ditch is to be filled the tractor will be moved backward and forward on the solid ground, pushing the loose dirt ahead of it into the trench, or if a roadway is to be scraped and smoothed the dirt at the side of the road is pushed ahead of the tractor to whatever position it may be desired to occupy. If the tractor is to be turned around, or the dirt to be disposed in a given place the handle 55 will be moved from one position to the other to cause the cables to raise the scraper whereupon the tractor may be either pushed ahead depositing a thinner or thicker layer of dirt upon the ground as it moves along, or it may be lifted entirely off the pile and moved in a different direction altogether.

Having thus described my invention what I desire to secure by Letters Patent of the United States is as follows, but modifications may be made in carrying out the invention as shown in the drawings and in the above particularly described form thereof, within the purview of the annexed claim:

A scraper of the class described comprising an endless tread tractor having a supporting frame, a forwardly extending arm pivoted on each side of said frame, a scraper having a curved transverse back, plates on each side of said back, spaced connectors on said back, flexible supports extending from said connectors to pivoted arms, a hydraulic cylinder having a piston adapted to operate said arms, means to supply power to said cylinder, and means to admit said power to the cylinder to move said piston in either direction or to hold it in a certain position.

In testimony whereof I have hereunto set my hand this 2" day of February, A. D. 1927.

WESLEY KENNETH McMILLAN.